United States Patent
Adyapak et al.

(10) Patent No.: US 9,977,717 B2
(45) Date of Patent: May 22, 2018

(54) SYSTEM AND METHOD FOR COALESCING AND REPRESENTING KNOWLEDGE AS STRUCTURED DATA

(71) Applicant: Wipro Limited, Bangalore (IN)

(72) Inventors: Srinivas Adyapak, Bangalore (IN); Raghavendra Hosabettu, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 235 days.

(21) Appl. No.: 15/180,348

(22) Filed: Jun. 13, 2016

(65) Prior Publication Data

US 2017/0286231 A1 Oct. 5, 2017

(30) Foreign Application Priority Data

Mar. 30, 2016 (IN) .............................. 201641011196

(51) Int. Cl.
*G06F 17/30* (2006.01)
*G06F 11/14* (2006.01)

(52) U.S. Cl.
CPC .... *G06F 11/1451* (2013.01); *G06F 17/30353* (2013.01); *G06F 17/30616* (2013.01)

(58) Field of Classification Search
CPC ..................... G06F 17/30353; G06F 17/30616
USPC ......................................................... 707/625
See application file for complete search history.

(56) References Cited

U.S. PATENT DOCUMENTS

| | | | |
|---|---|---|---|
| 6,064,971 A | 5/2000 | Hartnett | |
| 7,194,483 B1 | 3/2007 | Mohan et al. | |
| 7,480,642 B2 | 1/2009 | Koono et al. | |
| 7,707,161 B2 | 4/2010 | Hall et al. | |
| 8,332,348 B1 | 12/2012 | Avery | |
| 8,775,442 B2 | 7/2014 | Moore et al. | |
| 2002/0087567 A1 | 7/2002 | Spiegler et al. | |
| 2004/0034659 A1 | 2/2004 | Steger | |
| 2005/0222893 A1 | 10/2005 | Kasravi et al. | |

(Continued)

FOREIGN PATENT DOCUMENTS

| | | |
|---|---|---|
| WO | WO 02/10989 | 2/2002 |
| WO | WO 03/060766 | 3/2007 |

OTHER PUBLICATIONS

Extended European Search Report issued in the European Patent Office in counterpart European Application No. 16181117.9, dated Aug. 23, 2017, 9 pages.

*Primary Examiner* — Joshua Bullock
(74) *Attorney, Agent, or Firm* — Finnegan Henderson, Farabow, Garrett & Dunner LLP (57) ABSTRACT

In certain embodiments, the method may comprise, determining one or more features associated with each of one or more concepts from at least one sentence; determining at least one concept feature matrix based on the one or more features; determining one or more contribution factors among the one or more concepts, based on the at least one concept feature matrix; determining incremental synchronization data by storing current timestamp associated with the one or more concepts and comparing it with knowledge data; generating at least one new concept feature matrix based on the incremental synchronization data; determining one or more new contribution factors among the one or more concepts, based on the at least one new concept feature matrix; determining differential value between the one or more contribution factors and the one or more new contribution factors; and dynamically updating the knowledge data, in the repository system.

20 Claims, 4 Drawing Sheets

(56) References Cited

U.S. PATENT DOCUMENTS

| | | |
|---|---|---|
| 2006/0224635 A1 | 10/2006 | Bangel et al. |
| 2007/0143336 A1 | 6/2007 | Lindley et al. |
| 2008/0301174 A1 | 12/2008 | Mons et al. |
| 2011/0145028 A1 | 6/2011 | Khilnani |
| 2015/0178390 A1 | 6/2015 | Torras |
| 2015/0186777 A1 | 7/2015 | Lecue et al. |

SYSTEM AND METHOD FOR COALESCING AND REPRESENTING KNOWLEDGE AS STRUCTURED DATA

TECHNICAL FIELD

This disclosure relates generally to data management. More specifically, it relates to a system and method for coalescing and representing knowledge as structured data.

BACKGROUND

Enterprises today are spread across multiple-locations and work on multiple products, services and technologies. There is large information within the company and the evolution of information change can range from slow to dynamic. They can vary over space and time. Companies would expect collaboration among their employees through continuous upgrade of knowledge which can enable them to be effective at their work place. Companies that promote this kind of sharing and collaboration are finding that increased information flow helps employees do their jobs better, faster and less expensively, leading to productivity increase and competitive advantage. They have multiple channels for sharing information, example, instant messaging, virtual meeting technology, virtual team workspaces, enterprise wikis, Session management sessions, enterprise social media platforms etc. The evolution of information will be curated and controlled for policies at a company level. This could be related to an Employee, assets, locations etc.

The evolution of information is dynamic and changing more frequently in instances such as exchange of information in internal social media platforms like yammer, ticketing helpdesks, sessions conducted by SMEs. Though knowledge is created within the organization, the information is acquired from various channels and they may exist in silos. The challenge is to capture this evolving knowledge as a knowledge base irrespective of source and other constraints like time difference, location etc.

Accordingly, in light of the above, there exists a need for a system and method for coalescing and representing knowledge as structured data.

SUMMARY

Certain embodiments of the present disclosure relate to a method for coalescing and representing knowledge as structured data. In certain embodiments, the method may comprise determining one or determining, by a knowledge processor, one or more features associated with each of one or more concepts from at least one sentence; determining, by the knowledge processor, at least one concept feature matrix based on the one or more features; determining, by the knowledge processor, one or more contribution factors among the one or more concepts, based on the at least one concept feature matrix; determining, y the knowledge processor, incremental synchronization data by storing current timestamp associated with the one or more concepts and comparing it with knowledge data, wherein the knowledge data is pre-stored in a repository system generating, by the knowledge processor, at least one new concept feature matrix based on the incremental synchronization data; determining, by the processor, one or more new contribution factors among the one or more concepts, based on the at least one new concept feature matrix; determining, by the processor, differential value between the one and dynamically updating, by the knowledge processor, the knowledge data, in the repository system, based on the differential value.

Certain embodiments of the present disclosure also relate to a computer system for providing structured data, comprising at least one processor in electronic communication with a managing device, external manufacturer applications, and a single viewer devices dashboard; and a computer-readable medium storing instructions that, when executed by the at least one processor, cause the at least one processor to: determine one or determining, by a knowledge processor, one or more features associated with each of one or more concepts from at least one sentence; determine, by the knowledge processor, at least one concept feature matrix based on the one or more features; determine, by the knowledge processor, one or more contribution factors among the one or more concepts, based on the at least one concept feature matrix; determine, by the knowledge processor, incremental synchronization data by storing current timestamp associated with the one or more concepts and comparing it with knowledge data, wherein the knowledge data is pre-stored in a repository system generate, by the knowledge processor, at least one new concept feature matrix based on the incremental synchronization data; determine, by the processor, one or more new contribution factors among the one or more concepts, based on the at least one new concept feature matrix; determine, by the processor, differential value between the one or more contribution factors and the one or more new contribution factors; and dynamically update, by the knowledge processor, the knowledge data, in the repository system, based on the differential value.

In certain embodiments a non-transitory computer-readable medium storing instructions for representing knowledge as structured data, wherein upon execution of the instructions by one or more processors, the processors perform operations comprising: determining one or more features associated with each of one or more concepts from at least one sentence; determine at least one concept feature matrix based on the one or more features; determine one or more contribution factors among the one or more concepts, based on the at least one concept feature matrix; determine, incremental synchronization data by storing current timestamp associated with the one or more concepts and comparing it with knowledge data, wherein the knowledge data is pre-stored in a repository system generate, at least one new concept feature matrix based on the incremental synchronization data; determine one or more new contribution factors among the one or more concepts, based on the at least one new concept feature matrix; determine differential value between the one or more contribution factors and the one or more new contribution factors; and dynamically update the knowledge data, in the repository system, based on the differential value.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Figure 1:
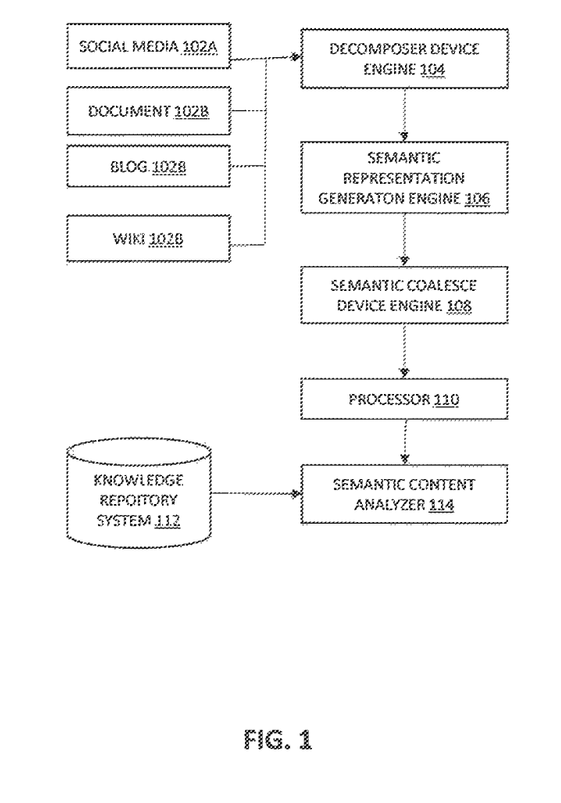
FIG. 1 illustrates an exemplary overview of a system for coalescing and representing knowledge as structured data, according to some embodiments of the present disclosure.

FIG. 1 illustrates an exemplary overview of a system 100 for coalescing and representing knowledge as structured data, according to some embodiments of the present disclosure.

The system 100 includes one or more input sources. For example a first input source 102a is social media content input, a second input source 102b is a word document, a third input source 102c is a blog and a fourth inputs source is a wiki page.

The one or more inputs sources thus feed in to a decomposition engine 104. The decomposition engine 104 is connected to a semantic representation generation engine 106. Further, the semantic representation generation engine 106 is connected to a semantic coalesce engine 108. The semantic coalesce engine 108 is then connected to a knowledge processor 110 herein after processor 110. The processor 110 is further connected to a semantic knowledge repository system 112 and a semantic content analyzer 114. The semantic content analyzer 114 is also coupled to the semantic knowledge repository system 112.

In certain embodiments, the one or more inputs sources is a sum total of documents, feeds from internal social media, wikis and blogs.

In other embodiments, one or more concepts and one or more features are extracted from the one or more input sources. For example, concepts are application specific and/or domain information extracted from the one or more input sources. Each concept has its own set of characteristics and is also related to another concept due its occurrence in a sentence. Features are the properties, attributes of the concepts.

End user in system 100 provides an enterprise document to the system 100 for knowledge representation and also assists in the knowledge updating activities. The internal systems mainly entertain conversations from internal social media platforms, ticketing systems, SME chat sessions. The major knowledge repository system 112 decomposes input data obtained from the one or more inputs sources, documents, internal systems and generates the knowledge from the inputs, creates the matrix of the concepts and the features.

The decomposition engine 104 decomposes the input data (knowledge) received from the one or more input sources, using natural language processing and semantic techniques for easier and better representation of knowledge. The decomposition engine 104 provides the input information to the knowledge representation system 112.

The system 100 is responsible for semantic representation generation using the semantic representation generation engine 106 and semantic content analysis using the semantic content analyzer 114.

In some embodiments, the input data (as in knowledge) from the one or more inputs sources is broken down from a natural language processing and semantic point of view while keeping the meaning intact.

Knowledge representation is generated as a matrix of concepts which is determined through a feature concept matrix and strength of relationship among features in the related concepts. For example, one or more concept matrix and one or more concept feature matrix. The processor 110 is responsible for this accomplishment of knowledge representation.

The knowledge repository system 112 is a storehouse of the one or more input sources. This will maintain versions and the corresponding mapping from the input data to the knowledge thus making the input data into the structured data.

Figure 2:
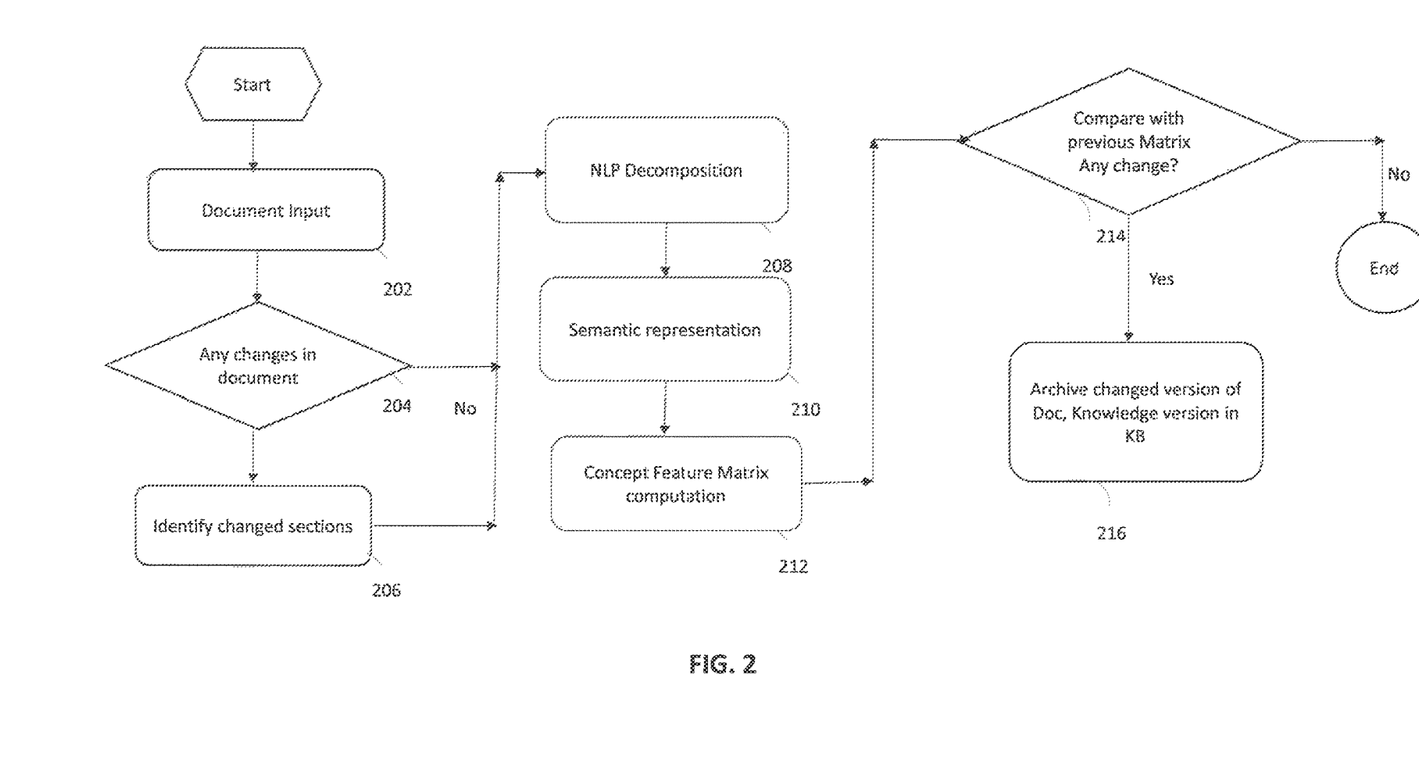
FIG. 2 is a flowchart of an exemplary method for coalescing and representing knowledge as structured data, according to some embodiments of the present disclosure.

The system 100 for coalescing and providing structured data is well explained in conjunction with FIG. 2.

FIG. 2 is a flowchart of an exemplary method for coalescing and representing knowledge as structured data, according to some embodiments of the present disclosure.

The FIG. 2 describes the below three major phases for coalescing and representing knowledge as structured data:

Phase 1: Knowledge Representation as the concepts and the features.

Phase 2: Knowledge Synchronization for handling changed inputs.

Phase 3: Archiving Knowledge Repository.

At step 202, the input data from the one or more input sources is decomposed using the decomposition engine 104. The decomposition engine 104 takes inputs from user such as a document, chat conversations, wikis from the input sources. For example the first input source 102a and the second input source 102b.

At step 204, it is determined if there are any changes to the document. If there are changes then step 206 is executed else step 208 is executed.

At step 206, the changes in the document are identified.

In some embodiments, if the input data is a document, the sections in the documents are identified and extracted. Subsequently the paragraphs are extracted. The extracts, sentences and phrases for other types of the one or more input sources and the sentences therein are broken into simple and complex structure. Phrases can be affirmative, declarative, descriptive and informative.

At step 208, NLP decomposition is executed.

At step 210 semantic representation is executed. In some embodiments, the semantic representation engine 106 is responsible for the one or more concepts identification. Initially list of the one or more concepts are provided by a domain expert. From the list of sentences and phrases, the stop words are identified and saved with the result as list of stop words that will be used later to remove from sentences and phrases. Further, using parser output to extract Proper Nouns (NN), Noun phrases (NP), verbs (VB) and saved into a Concepts-list. All valid concepts are further enhanced by synonyms using open source knowledge bases such as wordnet.

At step 212, concept feature matrix is computed.

In some embodiments, the words such as verbs/Adverb/Adjective which join the one or more concepts are extracted. Example of at least one feature verbs are kind of, type of, operation info, event related, action related. These words are features of the one or more concepts. Example, leave policy can be a concept. But the types of the concept leaves, as in annual leave and sick leaves, can be the two types of features of the concept leave.

In certain embodiments, the features will be enhanced like concepts.

In one example, the one or more concepts and the one or more features representation of Knowledge for an enterprise is given below.

A concept with a set of features is given as a vector below:

Concept $C1$=vector[feature1($W1$),feature2($W2$), . . . , feature $n(Wn)$]

where Ws are weights associated with the feature, $\Sigma Fi^*(Wi)=1$, for $I=1$ to $n$ Factors such as number of occurrences of a feature, same feature from different input sources, semantic equivalence of the feature are used for assigning the weights to a feature. Features which have semantic equivalence (via synonyms) are grouped together & such features will have the same weights. Some Features will be common across concepts.

The weights for a concept are normalized to 1. Example of the feature vector associated with weights for a concept:

Concept $C1=[fa1(0.3),fa2(0.2),fa3(0.5)]$

Concept $C2=[fb1(0.2),fb2(0.1),fb3(0.7)]$

Concept $C3=[fc1(0.25),fc2(0.25),fc3(0.25),fc4(0.25)]$

Features can be added/deleted/updated for a concept based on their occurrence in a sentence. The feature set in a concept will have a configurable weight normalized to 1. As more features gets added to or deleted from a concept, the weight will be recalculated and normalized.

For each sentence having multiple concepts, the features corresponding to their concepts are extracted.

This matrix of features corresponding to concepts is given below. The values in the brackets are the weights of the features for the respective concepts (concept C1 and concept C2).

Consider Sentence S1=C1(Fa1,Fa2)+C2(Fb1, Fb2) where Sentence S1 is made up of Concepts C1 and C2. The feature Fa1 and Fa2 are associated with Concept C1 and feature Fb1 and Fb2 are associated with Concept C2. The other features Fa3 for C1 and Fb3 for C2 are missing in the sentence. The concepts C1 and C2 are related in a sentence S1. The strength of the relationship is determined as a sum of the weighted product of the features associated with C1 and C2.

The strength of the relationship of C1 and C2 in S1 is 0.14 [0.06+0.03+0.04+0.01]

|  |  | C2 | | |
|---|---|---|---|---|
|  |  | Fb1(0.2) | Fb2 (0.1) | Fb3 (0) |
| C1 | Fa1 (0.3) | 0.06 | 0.03 | 0 |
|  | Fa2 (0.2) | 0.04 | 0.01 | 0 |
|  | Fa3 (0) | 0 | 0 | 0 |

In certain embodiments, the concept matrix is generated as below:

The concept relationship for sentences are derived using the following:
  concept feature vector;
  The dynamic feature interactions among the concepts in a sentence; and
  A weighted model for the features of interest corresponding to the related concepts.

The strength of relations between the one or more concepts is computed for all given sentences. The matrix is updated for all concept pairs with numbers ranging from 0 to 1. 0 no relationship, 1 is maximum. Consider sentences from an input source $S1=C1(Fa1,Fa2)+C2(Fb1,Fb2)$ $S2=C1(Fa2,Fa3)+C2(Fb2,Fb3)$ $S3=C2(Fb3)+C3(Fc3,Fc4)$ $S4=C2(Fb2)+C3(Fc2)$ Based on the method of calculation given above, Strength of (C1,C2) from sentences S1 (0.14) and S2 (0.56)=0.7

Strength of (C2,C3) from sentences S3 (0.35) and S4 (0.025)=0.375

From the concept matrix given below, contribution (also referred as one or more contribution factors) to the knowledge due to concepts C1, C2 is greater than contribution due to concepts C2, C3. The one or more concepts C1, C3 are not related and hence 0.

|  | C1 | C2 | C3 |
|---|---|---|---|
| C1 | 1 | 0.7 | 0 |
| C2A | 0.7 | 1 | 0.375 |
| C3t | 0 | 0.375 | 1 | step 214 the generated concept feature matrix is compared with a previously generated matrix to identify any changes. If any changes are identified then step 216 is executed else step 218 is executed.

At step 216, any differential value based on the comparison is identified and archived in the knowledge repository system 114 with the help of the processor 110.

At step 218, the process is terminated.

Figure 3A:
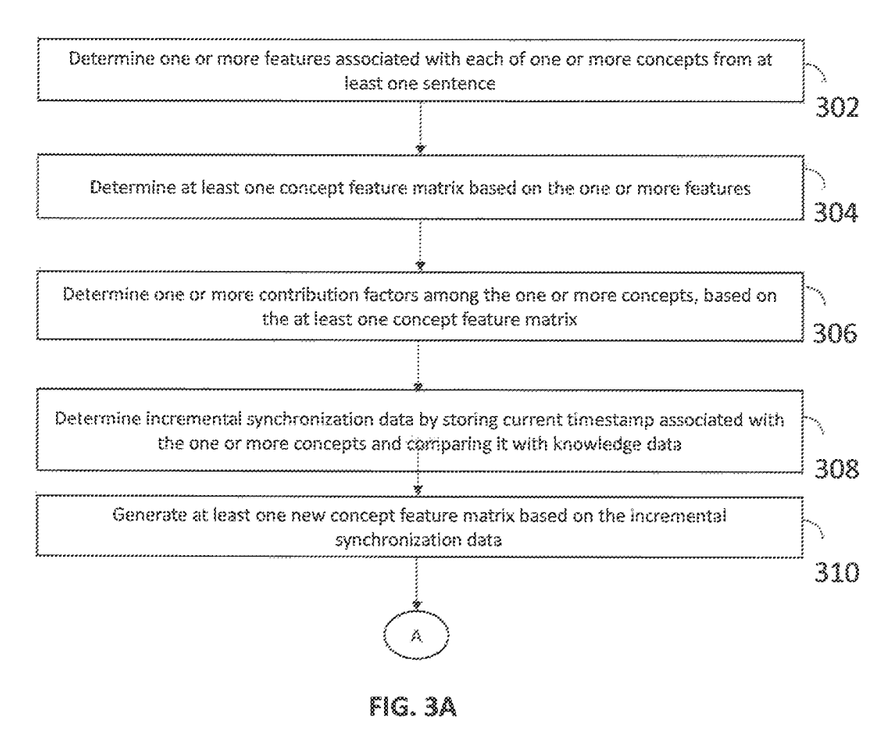
FIG. 3A and FIG. 3B are another set of flowcharts of an exemplary method for coalescing and representing knowledge as structured data, according to some embodiments of the present disclosure.
Figure 3B:
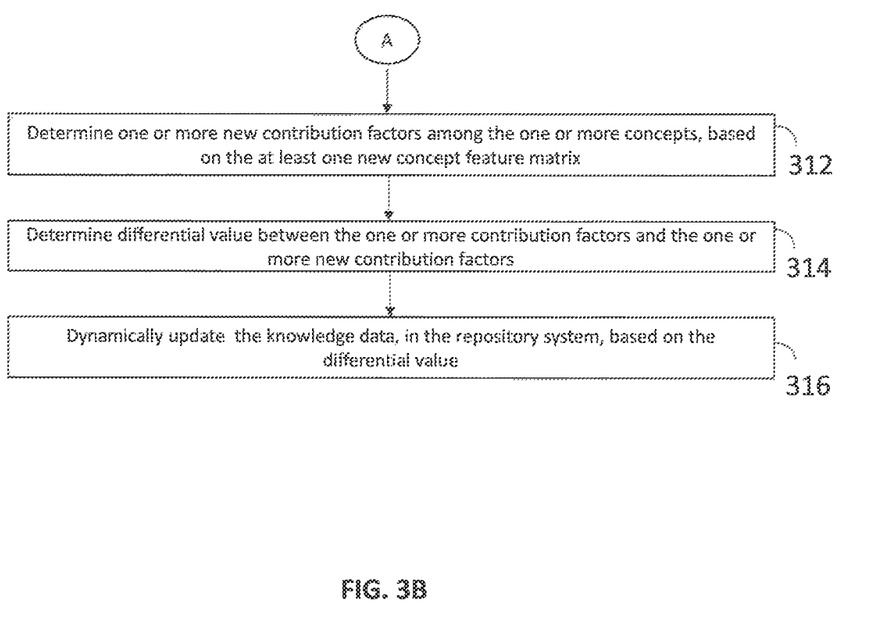

FIG. 3A and FIG. 3B are another set of flowcharts of an exemplary method for coalescing and representing knowledge as structured data, according to some embodiments of the present disclosure.

At step 302, the one or more features associated with each of one or more concepts from at least one sentence are determined.

At step 304, at least one concept feature matrix is determined based on the one or more features.

At step 306, one or more contribution factors are determined among the one or more concepts, based on the at least one concept feature matrix.

At step 308, incremental synchronization data is determined by storing current timestamp associated with the one or more concepts and comparing it with knowledge data. Here the knowledge data may pre-stored data in the repository.

At step 310, at least one new concept feature matrix based on the incremental synchronization data is generated.

At step 312, one or more new contribution factors is determined among the one or more concepts, based on the at least one new concept feature matrix.

At step 314, differential value is determined between the one or more contribution factors and the one or more new contribution factors.

At step 316, the knowledge data is dynamically updated, in the repository system, based on the differential value.

The FIG. 3 is well explained with the below example, which is as follows:
Example: Consider the following sentences, the associated concepts are given in the brackets
S1: A new employee above band B will be provided with laptop. [Asset & Employee]
S2: An existing employee after relocation has to update location details in my location application [Employee & Location]
S3: An employee has to get manager approval to avail leave [Employee & Leave policy]
S4: A new employee has to update details of the asset information in the my asset application. [Asset & Employee]
Concept Feature Vector Example:
Asset=[New (0.1), owner(0.1), details(0.1), provided (0.1), laptop(0.1), lost(0.1)]
Employee=[(New(0.2), Band B(0.1), existing(0.2), employee(0.1), manager(0.1), approval(0.1), update (0.1), relocation(0.1), above(0.1)]
Leave policy=[leave(0.1), sabbatical(0.1), sick(0.1), paternal(0.1), annual(0.2), apply(0.1), avail(0.1), reverse(0.3)]
Location=[update(0.1), details(0.2), . . . ,]
For the sentences given above, the impacted concepts and their corresponding features:
S1=Asset (Provide, laptop)+Employee(New, BandB, above);
S2=Employee (Existing, relocation)+Location (update, details);
S3=Employee (Manager, approval)+LeavePolicy (avail, leave);
S4=Asset (Details, update)+Employee (new).
The concept feature matrix for these concepts are computed
Concept-Feature Matrix:

|  | Employee | | |
| --- | --- | --- | --- |
|  | New(0.2) | BandB(0.1) | above(0.1) |
| Asset | Provide (0.1) | 0.02 | 0.01 | 0.01 |
|  | Laptop (0.1) | 0.02 | 0.01 | 0.01 |

|  | Employee | |
| --- | --- | --- |
|  | New(0.1) | |
| Asset | Details (0.1) | 0.01 |
|  | update (0.1) | 0.01 |

|  | Location | |
| --- | --- | --- |
|  | update(0.1) | details(0.2) |
| Employee | Existing (0.2) | 0.02 | 0.04 |
|  | relocation (0.1) | 0.01 | 0.02 |

|  | LeavePolicy | |
| --- | --- | --- |
|  | Avail(0.1) | Leave(0.1) |
| Employee | Manager(0.1) | 0.01 | 0.01 |
|  | Approval(0.1) | 0.01 | 0.01 |

The contribution of concepts for each sentence is given below:
(Asset, Employee) due to S1 and S4=[0.08+0.02]=0.1
(Employee, Location) due to S2=0.09
(Employee, Leave Policy) due to S3=0.04
Those concept pairs having no relations are given a 0.
The entire matrix is updated for the various set of concepts.
Concept Matrix:

|  | Asset | Employee | Locations | Leave Policy |
| --- | --- | --- | --- | --- |
| Asset | 1 | 0.1 | 0 | 0 |
| Employee | 0.1 | 1 | 0.09 | 0.04 |
| Location | 0 | 0.09 | 1 | 0 |
| Leave Policy | 0 | 0.04 | 0 | 1 |

Thus, the contribution to knowledge from the Asset and Employee is higher than other concepts for the given set of sentences.

Further, the contribution to knowledge among any pair of concepts is determined by
  Number of unique instances of phrases/sentences where the related concepts and features are appearing.
  Number of sentences that satisfy Semantic Coherence for the related concepts and features with high confidence.
  The strength of the relationship determined as a sum of the weighted product of the features associated with the concepts.

The phase 2 of the method for representing knowledge as structured data is given below, i.e. Knowledge Synchronization for handling changed data inputs:
  The differences between the current version of the input source and the newer version presented to the system is found using standard diff tool. Knowledge is kept current based on this differential input.
  For instance, an input source such as a document can have differences in various sections of the new document.
  The knowledge is generated for each of these new sentences, phrases.
  This changes to feature and concepts are detected based on incremental synchronization using semantic analysis and time stamps.
  Incremental synchronization is achieved by storing current timestamp and comparing them with the stored knowledge. Semantic comparison results in add, update of new knowledge, replace and delete will be based on user confirmation.

A new matrix for knowledge is generated. The difference in matrix values between the new and old matrix indicates the degree of dynamism in the knowledge for the pair of concepts.

The updated versions of the input source, knowledge are archived

The phase 3, of the method for representing knowledge as structured data is given below, i.e. Archiving Knowledge Repository for example Knowledge Repository system 112:

The knowledge repository will archive the versions of original input source and Knowledge Concept matrix. The Knowledge repository will contain Table linking all the non-zero values in the concept matrix and the corresponding sentences. This will be stored as KR.<version number>. Example, as given below:

Version of the Knowledge:

| Inputs | Knowledge Representation |
|---|---|
| InputSource.v01 | KR.v01 |

Knowledge is synchronized to handle changing inputs and correspondingly the knowledge repository is also updated. Example, as below:

| Inputs | Knowledge Representation |
|---|---|
| InputSource.v01 | KR.v01 |
| InputSource.v02 | KR.v02 |

By this approach the enterprise knowledge is always current and the corresponding knowledge representation are maintained in the repository.

Thus, the need to keep the knowledge current and unified in an evolving environment in an enterprise having data in a multi-structured form, originating from multiple channels is accomplished using the above method and system. The change in this continuously evolving environment thus can be easily managed through the process described above i.e. in conjunction with FIG. 1 to FIG. 3.

The specification has described systems and methods for coalescing and representing knowledge as structured data. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed:

1. A method for representing knowledge as structured data, the method comprising:
   determining, by a knowledge processor, one or more features associated with each of one or more concepts from at least one sentence;
   determining, by the knowledge processor, at least one concept feature matrix based on the one or more features;
   determining, by the knowledge processor, one or more contribution factors among the one or more concepts, based on the at least one concept feature matrix;
   determining, by the knowledge processor, incremental synchronization data by storing current timestamp associated with the one or more concepts and comparing it with knowledge data, wherein the knowledge data is pre-stored in a repository system;
   generating, by the knowledge processor, at least one new concept feature matrix based on the incremental synchronization data;
   determining, by the processor, one or more new contribution factors among the one or more concepts, based on the at least one new concept feature matrix;
   determining, by the processor, differential value between the one or more contribution factors and the one or more new contribution factors; and
   dynamically updating, by the knowledge processor, the knowledge data, in the repository system, based on the differential value.

2. The method of claim 1 wherein, the at least one sentence is identified from data received from at least one source.

3. The method of claim 2, further comprising:
   decomposing data into sections, paragraphs, the at least one sentence and at least one of a phrase.

4. The method of claim 1, further comprising:
   determining weight for each of the at least one feature using a weight allocation model; and
   generating the at least one concept feature matrix by mapping at least one feature to its corresponding at least one concept.

5. The method of claim 1, further comprising:
   generating at least one concept feature matrix.

6. The method of claim 1, wherein the one or more contribution factors are levels of knowledge contribution from the at least one concept feature matrix.

7. The method of claim 1 further comprising:
ranking the levels of knowledge contributions from at least a pair of concepts for a given set of sentences based on non-zero values in the at least one concept feature matrix.

8. The method of claim 1, wherein the incremental synchronization comprises:
semantic information and time stamps.

9. The method of claim 1, wherein the one or more new contribution factors are levels of knowledge contribution from the at least one new concept feature matrix.

10. A system for representing knowledge as structured data, comprising:
at least one processor in electronic communication with a managing device, external manufacturer applications, and a single viewer devices dashboard; and
a computer-readable medium storing instructions that, when executed by the at least one processor, cause the at least one processor to:
determining one or more features associated with each of one or more concepts from at least one sentence;
determining t least one concept feature matrix based on the one or more features;
determining one or more contribution factors among the one or more concepts, based on the at least one concept feature matrix;
determining incremental synchronization data by storing current timestamp associated with the one or more concepts and comparing it with knowledge data, wherein the knowledge data is pre-stored in a repository system;
generating at least one new concept feature matrix based on the incremental synchronization data;
determining one or more new contribution factors among the one or more concepts, based on the at least one new concept feature matrix;
determining differential value between the one or more contribution factors and the one or more new contribution factors; and
dynamically updating the knowledge data, in the repository system, based on the differential value.

11. The system of claim 10 wherein, the at least one sentence is identified from data received from at least one source.

12. The system of claim 11, further comprising:
decomposing data into sections, paragraphs, the at least one sentence and at least one of a phrase using a decomposition engine.

13. The system of claim 10, further comprising:
determining weight for each of the at least one feature using a weight allocation model; and
generating the at least one concept feature matrix by mapping at least one feature to its corresponding at least one concept.

14. The system of claim 10, further comprising:
generating at least one concept feature matrix.

15. The system of claim 10 wherein the one or more contribution factors are levels of knowledge contribution from the at least one concept feature matrix.

16. The system of claim 10 further comprising:
ranking the levels of knowledge contributions from at least a pair of concepts for a given set of sentences based on non-zero values in the at least one concept feature matrix.

17. The system of claim 10, wherein the incremental synchronization comprises:
semantic information and time stamps.

18. The system of claim 10 wherein the one or more new contribution factors are levels of knowledge contribution from the at least one new concept feature matrix.

19. A non-transitory computer-readable medium storing instructions for representing knowledge as structured data, wherein upon execution of the instructions by one or more processors, the processors perform operations comprising:
determining one or more features associated with each of one or more concepts from at least one sentence;
determining at least one concept feature matrix based on the one or more features;
determining one or more contribution factors among the one or more concepts, based on the at least one concept feature matrix;
determining incremental synchronization data by storing current timestamp associated with the one or more concepts and comparing it with knowledge data, wherein the knowledge data is pre-stored in a repository system;
generating at least one new concept feature matrix based on the incremental synchronization data;
determining one or more new contribution factors among the one or more concepts, based on the at least one new concept feature matrix;
determining differential value between the one or more contribution factors and the one or more new contribution factors; and
dynamically updating the knowledge data, in the repository system, based on the differential value.

20. The medium of claim 19 further comprising:
determining weight for each of the at least one feature using a weight allocation model; and
generating the at least one concept feature matrix by mapping at least one feature to its corresponding at least one concept.

* * * * *

UNITED STATES PATENT AND TRADEMARK OFFICE
CERTIFICATE OF CORRECTION

PATENT NO. : 9,977,717 B2
APPLICATION NO. : 15/180348
DATED : May 22, 2018
INVENTOR(S) : Srinivas Adyapak et al.

Page 1 of 1

It is certified that error appears in the above-identified patent and that said Letters Patent is hereby corrected as shown below:

On the Title Page

Abstract, Line 1, "comprise," should read as --comprise--.

Abstract, Line 17, "data, in" should read as --data in--.

In the Claims

Claim 1, Column 10, Line 48, "data, in the repository system," should read as --data in the repository system--.

Claim 10, Column 11, Line 23, "t least" should read as --at least--.

Claim 10, Column 11, Lines 41-42, "data, in the repository system," should read as --data in the repository system--.

Claim 19, Column 12, Lines 43-44, "data, in the repository system," should read as --data in the repository system--.

Signed and Sealed this
Sixth Day of November, 2018

Andrei Iancu
*Director of the United States Patent and Trademark Office*